R. R. BENNETT.
WEIGHING MACHINE.
APPLICATION FILED JULY 30, 1919.

1,353,139.

Patented Sept. 21, 1920.
4 SHEETS—SHEET 1.

INVENTOR
Ralph R. Bennett
BY John A. Chrismith
HIS ATTORNEY

R. R. BENNETT.
WEIGHING MACHINE.
APPLICATION FILED JULY 30, 1919.

1,353,139.

Patented Sept. 21, 1920.
4 SHEETS—SHEET 3

INVENTOR
Ralph R. Bennett
BY John A. Naismith
HIS ATTORNEY

R. R. BENNETT.
WEIGHING MACHINE.
APPLICATION FILED JULY 30, 1919.

1,353,139.

Patented Sept. 21, 1920.
4 SHEETS—SHEET 4.

INVENTOR
Ralph R. Bennett
BY John A. Gaismith
HIS ATTORNEY

UNITED STATES PATENT OFFICE.

RALPH R. BENNETT, OF SAN JOSE, CALIFORNIA.

WEIGHING-MACHINE.

1,353,139.   Specification of Letters Patent.   Patented Sept. 21, 1920.

Application filed July 30, 1919. Serial No. 314,340.

*To all whom it may concern:*

Be it known that I, RALPH R. BENNETT, a citizen of the United States, and resident of San Jose, in the county of Santa Clara and State of California, have invented certain new and useful Improvements in Weighing-Machines, of which the following is a specification.

My invention relates to a machine for weighing a required amount of fruit and placing the same in a properly positioned receptacle, and particularly to means for releasing a filled receptacle and replacing the same with an empty receptacle.

It is the object of my invention to provide means for automatically releasing a filled receptacle upon the closing of the hopper jaws and means for automatically positioning an empty receptacle for the reception of fruit after the removal of the filled receptacle. It is also an object of my invention to provide means for properly positioning receptacles and hoppers of various sizes.

Figure 1:
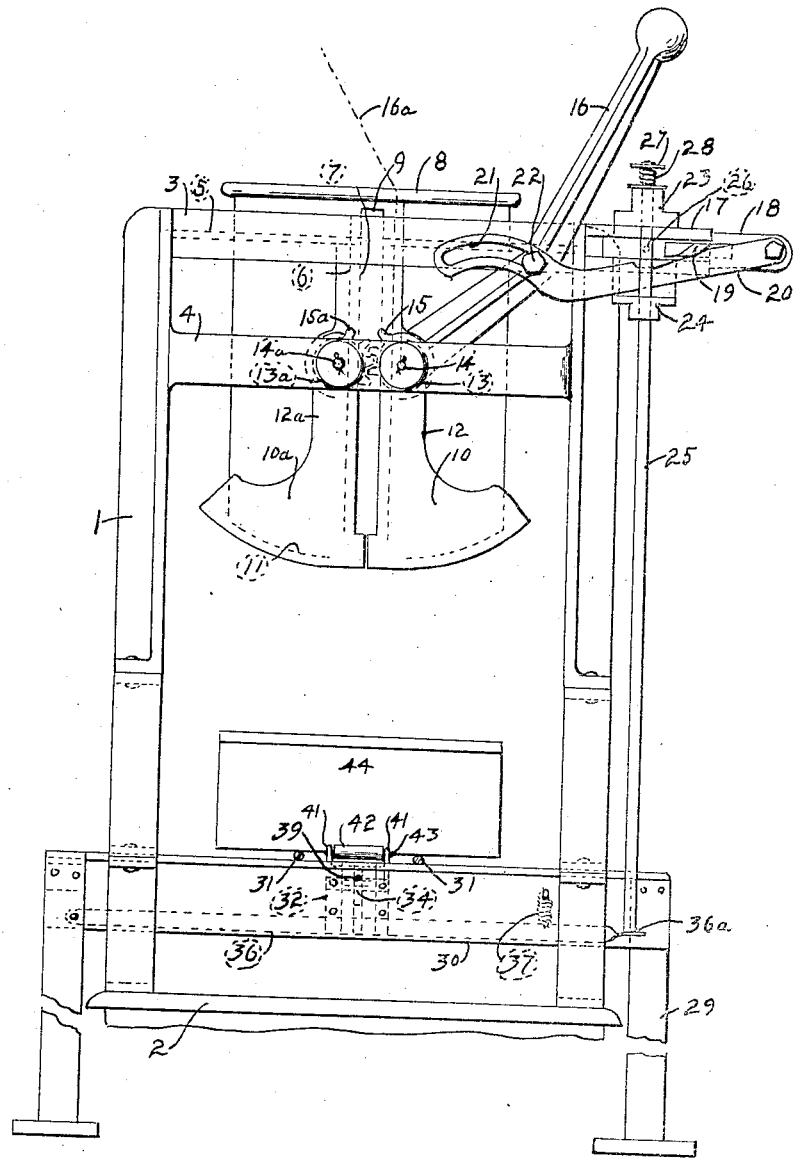
Figure 1 is an end elevation of the machine.
Figure 2:
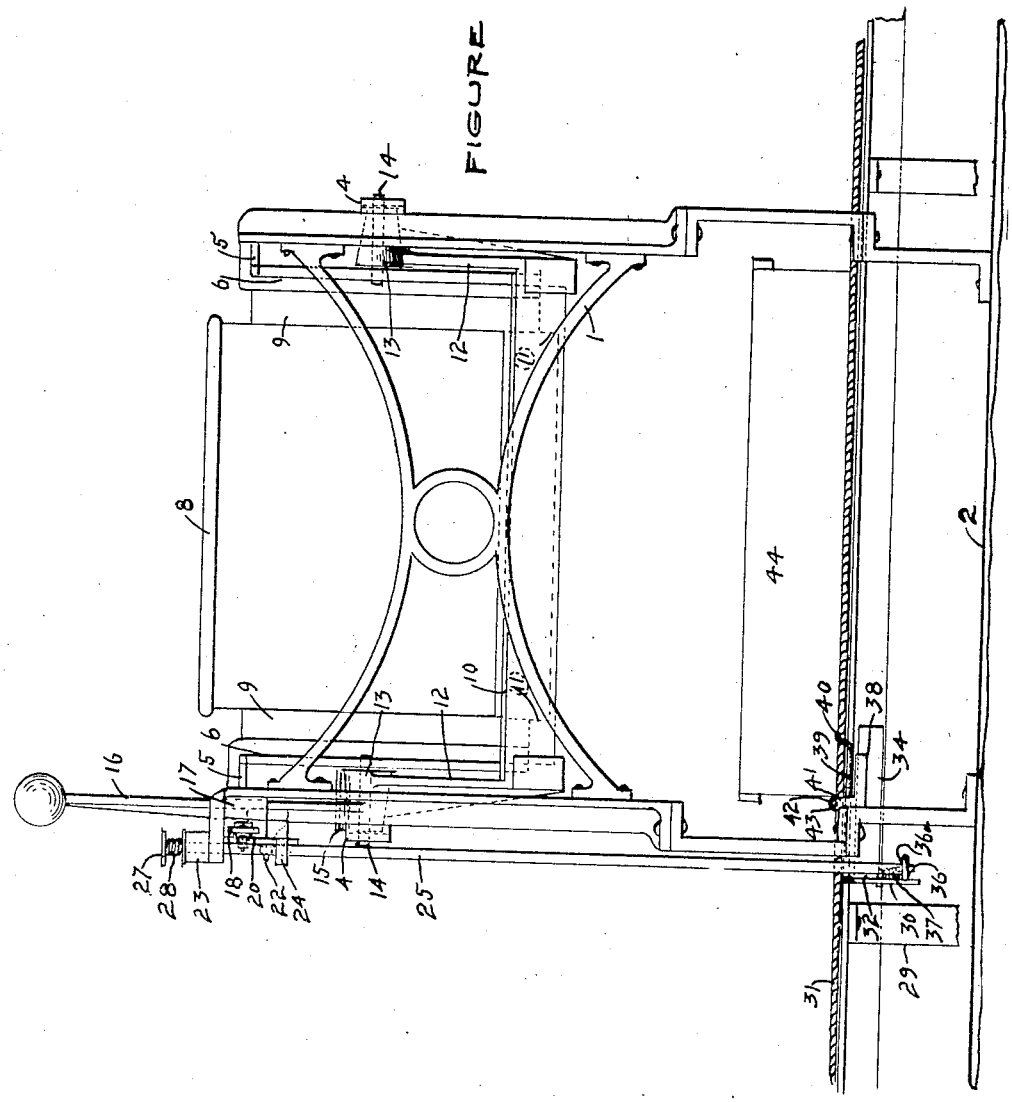
Fig. 2 is a side elevation of the machine.
Figure 3:
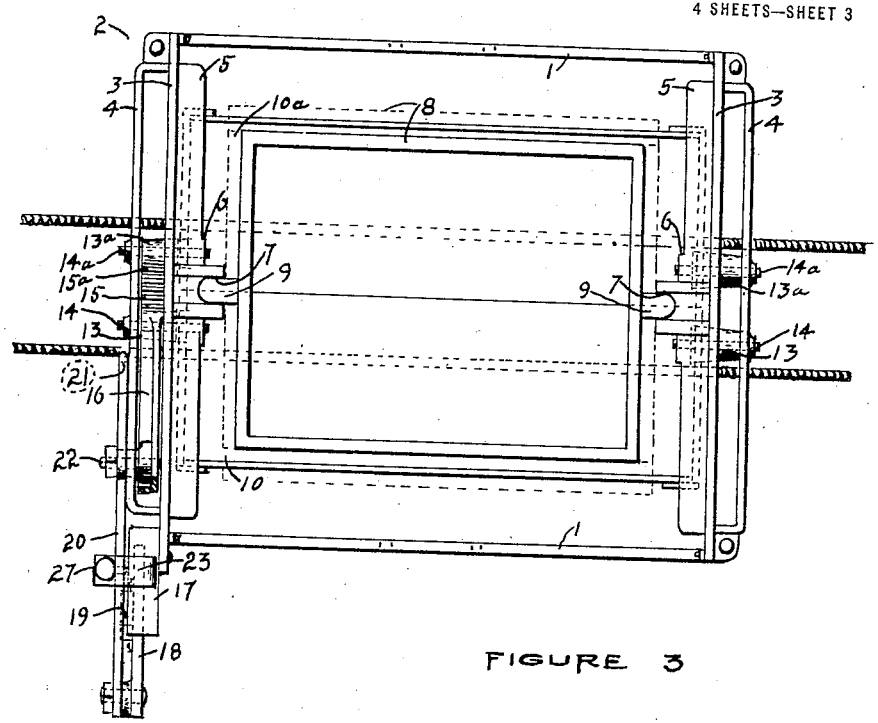
Fig. 3 is a plan view of the machine.
Figure 4:
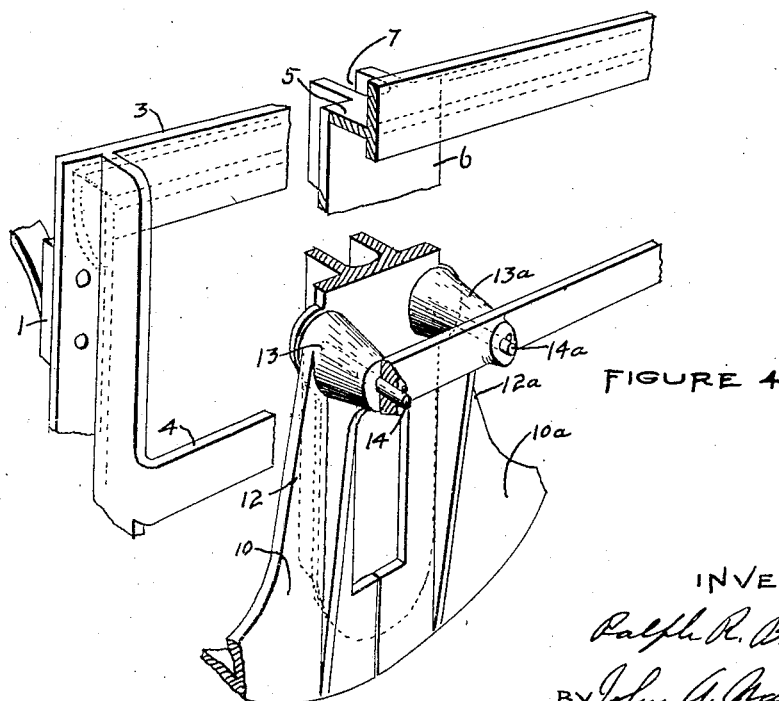
Fig. 4 is a perspective illustration showing the mounting of the hopper jaws on the frame of the machine, parts being broken away.
Figure 5:
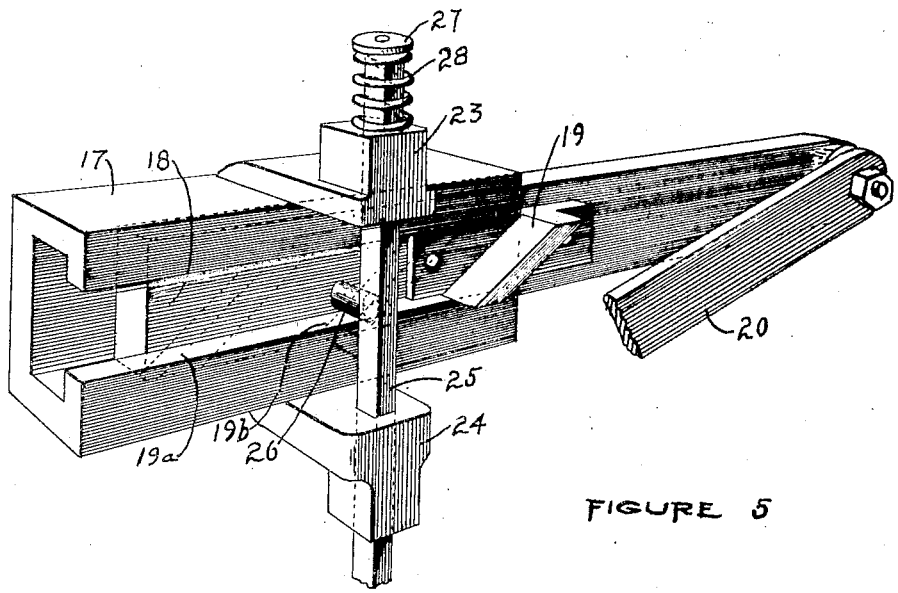
Fig. 5 is a perspective illustration of the trip operating mechanism, parts being broken away.
Figure 6:
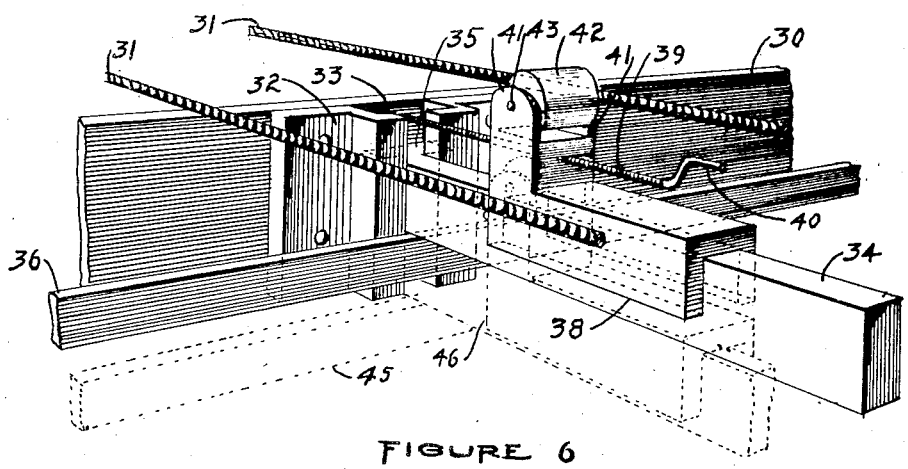
Fig. 6 is a perspective illustration of the receptacle positioning and adjusting mechanism.

Referring more particularly to the drawings, 1 indicates the side portions of the frame work of the machine mounted on scale platform 2, the scale being of any suitable type. The side portions 1 are connected by top end members 3 and offset end members 4. Each end member 3 has an inwardly projecting flange 5 supporting a depending guide and support 6 having a guide slot 7 formed therein. At 8 is shown a hopper open at top and bottom and provided with vertically positioned end guides 9 adapted to engage slot 7 and supports 6 as shown whereby it may be readily lifted out of the same.

At 10 and $10^a$ are shown a pair of hopper jaws normally closing the bottom of hopper 8 and having a curved contour operating closely in conjunction with the curved bottom edges of the ends of hopper 8 as shown at 11. Jaws 10 and $10^a$ are provided with arms 12 and $12^a$ respectively provided with bearings 13 and $13^a$ which rotate freely on shafts 14 and $14^a$ set in end members 4 and supports 6 as shown.

The bearings 13 and $13^a$ upon one end of the machine are provided with meshing segment gears 15 and $15^a$, the bearing 13 having an upwardly and outwardly extending arm or handle 16 secured thereto, the jaws 10 and $10^a$ normally remaining closed as shown but the operation of arm 16 to the position indicated in dotted lines at $16^a$ simultaneously opening them through the medium of gears 15 and $15^a$.

Mounted upon frame 1 is a slotted guide 17 in parallel relation to end member 3 and having a slide 18 mounted to reciprocate therein, said slide carrying an outwardly projecting angularly positioned lug 19 as shown. Pivotally attached to the outer end of slide 18 is an actuating arm 20 provided with a slot 21, handle 16 having a pin 22 positioned thereon to operate in slot 21 whereby slide 18 is moved a short distance forwardly and backwardly by the forward and backward movement of handle 16.

Guide 17 carries a pair of outwardly projecting axially alined bearings 23 and 24 respectively, preferably formed integrally therewith and in which is a vertically operating rod 25 provided with a fixed pin 26 extending toward said guide 17 and into the path of travel of lug 19. Rod 25 is provided with a terminal member 27 and a spring 28 is placed thereon between member 27 and bearing 23.

The receptacle positioning mechanism operated by said rod 25 is constructed as follows. A frame 29 is rigidly mounted about the scale platform 2 and has a cross member 30 passing over the same, this framework carrying the usual type of conveying cables operated in the usual way.

A bracket 32 is mounted upon the central part of cross-member 30 and is provided with a slot at 33. At 34 is shown a bar having a T shaped head 35 adapted to slide vertically in slot 33 and raised or lowered by means of a lever 36 pivotally attached to frame 29 as shown and passing under bar 34 which it supports, and thence outwardly to project a short distance beyond the side of frame 29 and engage the lower end of rod 25 as shown at 36ª, and held normally in a raised position as shown by spring 37. At 38 is shown a saddle-piece mounted to slide on bar 34 and tapped to receive a threaded rod 39 which is provided with a handle 40 at one end and has its other end mounted to rotate freely in cross member 30. Saddle-piece 38 carries a pair of ears 41 between which is mounted a roller 42 on shaft 43.

In operation receptacle 44 is carried forward by cables 31 until it contacts with roller 42, the roller 42 being adjusted on bar 34 by means of rod 39 until it is so positioned that each receptacle of the size being run is positioned directly under hopper 8. Fruit is now fed into hopper 8 until the scales upon which it is mounted indicate that the required quantity has been placed therein. Handle 16 is now thrown forward to the position 16ª, the pin 26 riding over lug 19, thereby opening jaws 10 and 10ª and depositing the fruit in the receptacle beneath and positioning slide 18 forward of pin 26 as shown at 19ª. The return of handle 16 to a normal position causes the jaws to close and lug 19 to engage pin 26 on rod 25 as indicated at 19ᵇ and force said rod downwardly. The downward movement of rod 25 throws lever 36 downwardly as indicated at 45 thereby allowing bar 34 and roller 42 mounted thereon to drop to a position as shown at 46, whereupon the cables 31 carry the filled receptacle away over roller 42. The moment box or receptacle 44 has passed roller 42 the said roller is raised to a normal position to intercept the box following by lever 36 actuated by spring 37. The rod 25 and pin 26 are at the same time raised to a normal position ready for the next tripping action by spring 28.

By means of the mechanism above described it is only necessary to feed the empty boxes upon conveyer 31, after member 38 has been properly adjusted on bar 34, and each box will be automatically held in position for filling and automatically released when filled at the time that jaws 10 and 10ª are closed.

It is understood that the machine herein shown and described illustrates a preferred embodiment of my invention, but that changes in form, proportions, construction and method of operation may be made within the scope of the appended claims.

I claim:—

1. A weighing machine comprising, in combination with a scale, a hopper mounted on said scale, opposed coacting jaws forming the bottom of said hopper when closed, means for operating said jaws, a conveyer operatively mounted over said scale and beneath said hopper, means for holding a receptacle in an operative position on said conveyer beneath said hopper, and means actuated by the closing of said jaws for removing said holding means.

2. A weighing machine comprising, in combination with a scale, a conveyer, a hopper and dumping means for said hopper operatively mounted with relation to each other, of means for arresting a receptacle on said conveyer beneath said hopper, and means actuated by one action of said dumping mechanism for releasing the arrested receptacle.

3. A weighing machine comprising, in combination with a scale, a conveyer, a hopper and dumping means for said hopper operatively mounted with relation to each other, of means for arresting a receptacle on said conveyer beneath said hopper, and means actuated by the closing action of said dumping mechanism for releasing the arrested receptacle.

4. A weighing machine comprising, in combination with a scale, a conveyer, a hopper and dumping means for said hopper operatively mounted with relation to each other, of means for arresting a receptacle on said conveyer beneath said hopper, a rod mounted to actuate said releasing means, and means actuated by the closing action of said dumping mechanism for operating said rod.

5. A weighing machine comprising, in combination with a scale, a conveyer, a hopper and dumping means for said hopper operatively mounted with relation to each other, of means for arresting a receptacle on said conveyer beneath said hopper, and means actuated by one action of said dumping mechanism for releasing the arrested receptacle by removing said arresting means from the path of travel of said receptacle, and means for automatically returning said arresting means to its former position after the passage of said receptacle.

6. A weighing machine comprising, in combination with a scale, a conveyer, a hopper and dumping means for said hopper operatively mounted with relation to each other, of means for arresting a receptacle on said conveyer beneath said hopper, a tripping means operated by said dumping means, a rod mounted to actuate said releasing means, and means whereby said rod is actuated to operate said releasing means by the movement of said tripping means.

7. A weighing machine comprising, in combination with a scale, a conveyer, a hopper and dumping means for said hopper operatively mounted with relation to each other, said dumping means including an operating lever, of means for arresting a receptacle on said conveyer beneath said hopper, a resiliently mounted rod mounted to actuate said releasing means, a pin carried by said rod, and means actuated by said operating lever to engage said pin and operate said releasing means.

8. A weighing machine comprising, in combination with a scale, a conveyer, a hopper and dumping means for said hopper operatively mounted with relation to each other, said dumping means including an operating lever, of means for arresting a receptacle on said conveyer beneath said hopper, a member mounted on said machine and having a guide slot formed therein, a tripping member mounted to slide in said guide slot, a member connecting said operating arm and said tripping member whereby the same may be moved a predetermined distance in either direction by said operating arm, and means actuated by said tripping member for operating said releasing means during the closing action of said dumping means.

9. A weighing machine comprising, in combination with a scale, a conveyer, a hopper and dumping means for said hopper operatively mounted with relation to each other, of means for arresting a receptacle on said conveyer beneath said hopper and comprising a vertically adjustable bar extending longitudinally of said machine below the plane of the conveyer, a receptacle arresting means mounted on said bar, means for normally holding said arresting means above the plane of the conveyer, and means operated by the closing action of the said dumping mechanism for temporarily withdrawing said arresting means below the plane of the conveyer.

10. A weighing machine comprising, in combination with a scale, a conveyer, a hopper and dumping means for said hopper operatively mounted with relation to each other, of means for arresting a receptacle on said conveyer beneath said hopper and comprising a vertically adjustable bar extending longitudinally of said machine below the plane of the conveyer, a receptacle arresting means mounted on said bar, means for adjustably positioning said arresting means on said bar, means for normally holding said arresting means above the plane of the conveyer, and means operated by the closing action of the said dumping means for temporarily withdrawing said arresting means below the plane of the conveyer.

11. A weighing machine including, in combination with a scale, a hopper frame mounted thereon, a hopper removably mounted in said frame, opposed coacting jaws forming the bottom of said hopper when closed, means for operating said jaws, a conveyer operatively mounted over said scale beneath said hopper, means for holding a receptacle in an operative position on said conveyer beneath said hopper, and means actuated by the closing of said jaws for removing said holding means.

12. A weighing machine comprising, in combination with a scale, a conveyer, a hopper frame and hopper dumping means operatively mounted with relation to each other, of a hopper removably mounted in said frame in operative relation to said dumping means, means for arresting a receptacle on said conveyer beneath said hopper, and means actuated by the operation of said dumping means for removing said arresting means.

13. A weighing machine comprising, in combination with a scale, a conveyer, a hopper frame and hopper dumping mechanism operatively mounted with relation to each other, of a hopper removably mounted in said frame in operative relation to said dumping means, means for arresting a receptacle on said conveyer beneath said hopper means for adjusting said arresting means to properly position a given sized receptacle with relation to a given hopper, and means actuated by the operation of said dumping means for removing said arresting means.

RALPH R. BENNETT.